Patented June 18, 1940

2,205,232

UNITED STATES PATENT OFFICE 2,205,232

INSECT REPELLENT

Wendell H. Tisdale, Wilmington, Del., and Ira Williams, Woodstown, N. J., assignors to E. I. du Pont de Nemours & Company, Wilmington, Del., a corporation of Delaware No Drawing. Application August 26, 1937, Serial No. 161,041

4 Claims. (Cl. 167—22)

This invention, which relates to the control of insect pests, is predicated upon the discovery that thiuram sulfides are inherently obnoxious to chewing insects, particularly the Japanese beetle, and consists in the application and the use of thiuram sulfides as repellents to prevent chewing insects from attacking and feeding on the plants.

There are in general four means for controlling insects, namely, stomach poisons, contact poisons, repellents, and traps. In the first, chewing or leaf-eating insects are allowed to feed on poisons applied to foliage, and in the second poisonous materials are applied directly to the insects and act through absorbency. In the third, the insects are repulsed by application to the plant or animal of a material which is obnoxious to the insects, and in the fourth the insects are attracted to traps or poisons by means of attractive baits.

It is known, as disclosed in our Australian Patent 8,103 granted July 4, 1932, that certain derivatives of dithiocarbamic acid, including thiuram sulfides, are effective as contact poisons for sucking insects such as aphids. It is well recognized, however, that the suitability of a given material for use as a contact poison is no indication of its effectiveness as a stomach poison or repellent.

Moreover, the manner and mode of applying contact poisons are fundamentally different from the manner and mode of applying stomach poisons and repellents. Contact poisons are applied directly to the pest and require wetting and penetration to promote effective contact. Stomach poisons and repellents on the contrary, are applied directly to the host and require permanency of application. It is not necessary that a contact poison remain on the host whereas with stomach poisons and repellents retention of the material on the host is essential.

In the control of chewing insects, such as the Japanese beetle, where infestation is intense, poisons both stomach and contact are ineffective. The inroads of fresh insects is so great that regardless of the number of insects killed severe damage to foliage results. Repellents, consequently, have become recognized as the most desirable and successful means for controlling such pests.

In the control of Japanese beetles lead arsenate is generally recommended as a repellent. While lead arsenate is a well known stomach poison its action on Japanese beetles is predominately repellent. Its action in this manner is apparently due to the fact that the beetles cease feeding before they have consumed lead arsenate in lethal amounts. Some repellent action may also be attributed to the white residue.

Lead arsenate is undesirable not only because it is toxic to human beings but also because the toxic effect, due to the lead, is cumulative. Extreme care accordingly must be exercised to prevent poisoning, not only during application but also as a result of the consumption of the treated produce.

Moreover, lead arsenate can be applied to certain types of plants only. Peaches, plums, stone fruits in general, and other plants are notoriously sensitive to lead arsenate.

For plants sensitive to lead arsenate, lime is commonly recommended as a repellent. Lime, however, is less effective and, moreover, leaves an objectionable white residue. The repellent action of lime is apparent due to this white residue as, under conditions of forced feeding, foliage treated with lime is entirely consumed within twenty-four hours without any apparent lethal effect.

Derris has also been suggested as a repellent for Japanese beetles and has proved quite effective in preventing attack. Derris, however, has the disadvantage of requiring an excessive number of applications during the period of infestation.

We have now found that thiuram sulfides are especially effective repellents for chewing insects. In numerous applications which we have made to various hosts for the control of various insects we have observed definite indication of the repellent action of thiuram sulfides. In many instances, notably for the control of Japanese beetles, we have found the repellent action so strong that the beetles will not eat any appreciable amount of foliage protected by thiuram sulphides even under exacting conditions of forced feeding.

Besides being exceptionally effective repellents the thiuram sulfides of this invention offer other important advantages in the control of chewing insects. Unlike lead arsenate they may be applied to almost any kind of foliage without injury and are free from any objectionable toxicity to human beings. Moreover, they do not leave any appreciable unsightly or objectionable residue, as is the case with lead arsenate or lime. In addition, in comparison with derris, which is the only other material which we have found to approach the thiuram sulfides in efficiency of the repellent action, the thiuram sulfides exhibit greater permanency on foliage so that effective control may be obtained with fewer applications during the period of infestation.

As is well known, the effectiveness of any particular control varies with the different kinds of insects. Materials which are effective control for certain types of insects may be ineffective for the control of other types. Likewise, a material which may act as stomach poisons for certain types may act as repellents for other types.

The thiuram sulfides of this invention are no exception to this general rule. For example, tetra butyl thiuram monosulfide, which has been found to be an exceptionally good repellent for Mexican bean beetles, is less effective against Japanese beetles and has an intermediate effectiveness against Colorado potato beetles.

Comparable results were obtained, however, for the three types of insects with tetra methyl thiuram monosulfide, tetra methyl thiuram disulfide, and tetra ethyl thiuram monosulfide. The kill was seldom high and protection of foliage due almost entirely to repellent action, the beetles preferring starvation to feeding, and the small amount of foliage eaten being attributable largely to incomplete coverage.

It will be apparent, of course, that irrespective of the repellent used there will always be a certain amount of feeding whether it be due to incomplete coverage, to a particular attractiveness of certain plants for certain insects, or to the vigorous feeding habits of certain insects. All that can be expected of a good repellent is the prevention of any substantial injury to the plant. Thus any material which prevents or substantially retards feeding may be considered as a good repellent.

In the control of such insects as the Japanese beetle wherein the plants are repeatedly infested by the insects in large number, it is particularly important that the repellent prevent any substantial amount of feeding as otherwise the successive inroads of beetles would soon result in severe damage to the foliage.

For this purpose we have found that tetra alkyl thiuram sulfides, particularly those containing short chain substituents such as methyl and ethyl, are the most outstanding in the repellent action. Both the mono and di- sulfides have been found exceptionally effective. Other thiuram sulfides may be employed if desired, but in general we have found that the repellent action decreases as the length of the carbon chain is increased.

Very valuable repellent action by other thiuram sulfides has also been observed, and our invention comprises the use of other thiuram sulfides such as aromatic or aliphatic-aromatic or mixed thiuram sulfides such as methyl-ethyl, phenyl-methyl, etc., compounds and their nitro, hydroxy, chlor-phenyl or halogen-alkyl compounds.

In the protection of foliage we have found that more consistently uniform results may be obtained with aqueous dispersions or sprays, as more uniform coverage and better adherence are obtained. Good results, however, have been obtained with dusts, but larger concentrations of active ingredients are required to obtain comparable coverage and repellent action.

Preliminary tests conducted on Mexican bean beetles gave indication of repellent action. These tests were conducted on a rather small scale using from 10 to 20 beetles per test but, nevertheless, show definite indications of repellent action. The results of these tests are summarized in the following table:

Table I

| Compound (as aqueous spray) | Concentration of active ingredient | Average per cent dead | Foliage eaten, per cent |
|---|---|---|---|
| Tetra ethyl thiuram monosulfide | 1-800 | 10 | 5-10 |
| Tetra methyl thiuram monosulfide | 1-400 | 10 | 1-5 |
|  | 1-200 | 30 | 1-5 |
| Tetra methyl thiuram disulfide | 1-400 | 10 | 5-10 |
| Tetra butyl thiuram monosulfide | 1-400 | 5 | 1-5 |
| Lead arsenate | 1-400 | 30 | 75-90 |

Starvation tests were made simultaneously, but in view of the small number of beetles tested were inconclusive. Consequently, it could not be determined whether the beetles died from poisoning, from starvation or from natural causes. In some instances, for example, starvation check ran as high as 30 per cent, whereas in others as low as zero.

In similar tests conducted on Colorado potato beetles tetra methyl thiuram mono and di- sulfides were almost as effective as against the Mexican bean beetle. Tetra ethyl thiuram monosulfide and tetra butyl thiuram monosulfide, however, while about as effective as lead arsenate, were considerably less effective.

Repellent action of the thiuram sulfides has also been observed on tent caterpillars, cucumber beetles, and tomato worms.

These original experiments were so encouraging that large scale tests were undertaken on the Japanese beetle. The Japanese beetle was selected primarily in view of the outstanding need for a good control in this field. Various tests conducted on different locations by different research workers showed that the thiuram sulfides have an outstanding repellent action on the Japanese beetle. These tests included both laboratory and field tests.

The laboratory tests were conducted according to the standard cage method developed by W. E. Fleming, Journal of Agricultural Research, vol. 48, No. 2, pages 115-130, 1934. Smartweed, employed as the host, was sprayed by paint spray gun operating under twenty pounds pressure. Only those plants which were uninjured by the spray were employed in these tests. The tests were carried out under conditions of uniform temperature and humidity conducive to maximum activity and feeding. Each test included a starvation check and a lead arsenate control. Lime-aluminum sulfate mixture was found unsuitable as a control because the vigor of the insect under the exacting conditions of the tests caused this repellent to fail completely. The foliage was completely eaten away within twenty-four hours.

The following table illustrates the results obtained in a series of three tests using fifty beetles per test:

Table II

| Composition | Concentration in parts per hundred | Per cent dead | Per cent foliage eaten | Coefficient of efficiency |
|---|---|---|---|---|
| Starvation | | 30 | | |
| Lead arsenate | 1 | 73 | 25 | 1 |
| Tetra methyl thiuram disulfide | 1 | 36 | 0 | 0.14 |

The vigorous conditions of the tests are illustrated by the large number of beetles killed by the lead arsenate control. In the field very few beetles are killed by lead arsenate as the beetles cease feeding before they consume the lead arsenate in lethal amounts. Under these tests, however, where optimum conditions of temperature and humidity are maintained, considerable forced feeding is obtained.

It is significant to note that the number of beetles killed by the tetra ethyl thiuram disulfide does not differ materially from the number which died a natural death by starvation. The difference is within the limits of biological error. It is evident, therefore, that the repelling action of tetra ethyl thiuram monosulfide is markedly superior to that of lead arsenate.

In these tests the coefficient of efficiency for the thiuram sulfide is determined in accordance with Fleming's formula as the ratio of the per cent dead over and above the per cent dead by starvation to the per cent dead with lead arsenate over and above the per cent dead by starvation. For example, $$\frac{36-30}{73-30} = 0.14$$

Obviously, the coefficient of efficiency for lead arsenate is always 1. It is also evident that the lower values for the coefficient of efficiency are indicative of superior repellent action.

It may be pointed out that the coefficient of efficiency gives no indication of the amount of protection offered to the foliage, but on the contrary indicates only the relative efficiency of the two materials as stomach poisons. Consequently, where the coefficient of efficiency is small, as in this case, the protection of the foliage must be attributed solely to the repellent action of the thiuram sulfide.

A further series of tests were conducted on a larger scale, using 200 beetles per test. The tests were repeated ten times. Tetra methyl thiuram disulfide, tetra methyl thiuram monosulfide, and tetra ethyl thiuram monosulfide were employed in the following compositions:

Composition A

| | Per cent |
|---|---|
| Tetra methyl thiuram disulfide | 80.0 |
| Bancroft clay | 18.8 |
| Decanol | 0.7 |
| Sulfonated condensation product of naphthalene and formaldehyde | 0.5 |

Composition B

| | Per cent |
|---|---|
| Tetra methyl thiuram monosulfide | 80.0 |
| Bancroft clay | 18.8 |
| Decanol | 0.7 |
| Sulfonated condensation product of naphthalene and formaldehyde | 0.5 |

Composition C

Fifty parts tetra ethyl thiuram monosulfide dissolved in an equal quantity of coconut oil and emulsified with 2 parts sodium decyl sulfate and 48 parts of solubilized casein consisting of 14 parts casein, 4 parts trisodium phosphate, duodecahydrate, and 150 parts water.

The following table illustrates the results:

Table III

| Composition | Concentration in pounds per 100 gallons | Percent foliage eaten | Coefficient of efficiency |
|---|---|---|---|
| Lead arsenate | 8 | 12 | 1 |
| Tetra methyl thiuram disulfide (Composition A) | 10 | 6 | 0.237 |
| Tetra methyl thiuram monosulfide (Composition B) | 10 | 5 | 0.147 |
| Tetra ethyl thiuram monosulfide (Composition C) | 32 | 5 | 0.001 |

These tests were carried out on the basis of eight pounds of active ingredient per 100 gallons of water. This corresponds to the most effective concentration for lead arsenate.

It is evident from these data that the thiuram sulfides not only offer protection superior to lead arsenate but also that the protection is due almost entirely to the repelling action of the thiuram sulfides.

Another series of tests were conducted to show the effect of reduction in concentration. Ten replicates were made using 200 beetles per test. The results are summarized in the following table:

Table IV

| Composition | Concentration in pounds per 100 gallons | Percent foliage eaten | Coefficient of efficiency |
|---|---|---|---|
| Lead arsenate | 4 | 10 | 1 |
| Tetra methyl thiuram disulfide (Composition A) | 5 | 5 | 0.025 |
| Tetra methyl thiuram monosulfide (Composition B) | 5 | 5 | 0.046 |
| Tetra ethyl thiuram monosulfide (Composition C) | 16 | 5 | 0.001 |

Further tests were conducted with greater dilutions, but it was found that consistently better results were obtained in concentrations at four pounds of active constituent per 100 gallons, as illustrated in Table IV. In many instances excellent results were obtained with sprays of one or two pounds of active constituent per 100 gallons. For example, good results were obtained with tetra methyl thiuram monosulfide (Composition B) at one pound active constituent per 100 gallons. In this case the effectiveness was equal to lead arsenate in 4 pounds per 100 gallons.

In view of the excellent results obtained in the large scale laboratory tests described above, field tests were conducted to determine the effectiveness of thiuram sulfides as repellents for Japanese beetles in their natural habitat. The tests were conducted with Compositions A and B given above, as well as with the following composition:

Composition D

| | Per cent |
|---|---|
| Tetra methyl thiuram disulfide | 42.0 |
| Sulfonated condensation product of naphthalene and formaldehyde | 0.5 |
| Water | Balance |

A small rectangular planting, including several varieties of apple and peach trees which had been severely injured by the Japanese beetle during the previous season, was selected for this test. For test purposes the plot was divided into 20-tree plots containing an equal number of trees of each variety. All plots extended completely across the orchard. Sprays were applied three times during the period of infestation, the first application being made before the Japanese beetle appeared in large number and the subsequent application when feeding became noticeable. Good coverage was obtained with each material at an average rate of three and one-half gallons per tree.

Each of these compositions was diluted to four pounds of active ingredients to 100 gallons of water, and included one pint per hundred gallons of water of 40-per cent rosin residue emulsion as a sticking agent. As the tests were conducted on peaches and apples simultaneously, lead arsenate could not be used as a control. The control used contained 20 pounds of hydrated lime and 3 pounds of aluminum sulfate per 100 gallons of water. The results are listed in the following table:

Table V

| Composition | Concentration in pounds per 100 gallons | Per cent foliage eaten |
|---|---|---|
| Tetra methyl thiuram disulfide (Composition A) | 5 | 8 |
| Tetra methyl thiuram monosulfide (Composition B) | 5 | 10 |
| Tetra methyl thiuram disulfide (Composition D) | 8 | 7 |
| Control | 20 | 74 |

These field tests corroborate very closely the tests made in the laboratory. Although the coverage obtainable in the field is not so uniform as that obtained in the laboratory, nevertheless, excellent control was obtained. This lack of uniform coverage in the field is, of course, compensated to some extent by the less vigorous feeding habits by the beetles in their natural habitat. The exceptionally good results obtained with lime may be accounted for by the erratic action of lime which, as is well known, varies in effectiveness under different conditions, giving in some instances good control and in others hardly any.

Tetra methyl thiuram disulfide has consistently shown up better in the field than tetra methyl thiuram monosulfide, although the later gave consistently better results in the laboratory test. The cause of this difference is not definitely known as yet, though it may be that it is due to the fact that better and more permanent coverage is obtained with the disulfide. In any event, tetra methyl thiuram disulfide and tetra methyl thiuram monosulfide have consistently shown marked superiority in the control of Japanese beetles, not only over other thiuram sulfides but also over standard repellents used for this purpose.

Further field tests on a larger scale were conducted for determining the performance of the thiuram sulfides in comparison with other treatments that have been recommended for minimizing the foliage injury done by Japanese beetles. Tetra methyl thiuram disulfide, compounded as given in Composition A above, was used in these tests.

The most extensive of these field tests was conducted in a 5-acre young apple orchard temporarily interplanted, as is frequently the custom, with peach trees. The orchard, located near Centerville, Delaware, was approximately ten rows in width, though in some places it was twelve. It was 47 rows in length. A strip three trees wide and 10 trees long was used for each of 14 of the 18 treatments tested. Hence, each treatment was tested on approximately 30 trees.

The comparison given in Table VI below are the final results obtained from two applications during the period of greatest beetle activity. The first application was made at the imminence of infestation when the beetles began to appear in large number and the second fourteen days later, at which time migration into the plots receiving ineffective treatments had resulted in conspicuous injury to the trees. All treatments were observed at regular intervals, usually every second day. The final observations were made when beetle activity was rapidly declining and at which time the earliest peaches in the orchard, the variety Alton, were ready for the first picking.

The treatments referred to here were as follows:

(1) Lime (high-grade spray quality) pounds__ 20
    Aluminum sulfate (technical)___do____ 3
    Water_____gallons__ 100

This treatment is recommended for use on plants such as peaches which will not tolerate lead arsenate at the recommended 6 pounds per 100 gallons dosage or on fruits in general where such dosage results in a poisonous residue that is really a human health hazard.

(2) Cube (4 per cent rotenone 16 per cent total extractives)_____pounds__ 4
    Rosin residue emulsion (modified Goodhue-Fleming formula) 4 pints__lbs.___ 4
    Water_____gallons__ 100

This treatment is likewise a standard or reference treatment recommended by the New Jersey Experiment Station and also by the U. S. Bureau of Entomology and Plant Quarantine for the reasons given under treatment No. 1.

(3) Tetra methyl thiuram disulfide (Composition A)_____pounds__ 5
    Rosin residue emulsion (mod. Goodhue-Fleming)_____pounds__ 1
    Water_____gallons__ 100

The active ingredient in this spray is 4 lbs.

(4) Tetra methyl thiuram disulfide (Composition A)_____pounds__ 2½
    Rosin residue emulsion_____do____ 1
    Water_____gallons__ 100

Active ingredient in this spray is 2 lbs.

In the tabular results injury is rated in five categories:

None_____ 0   Moderately heavy____ 3
Very light_____ 1   Heavy_____ 4
Light_____ 2

The scoring was done in cooperation with a representative of the Department of Entomology, University of Delaware. Each tree in each treatment was scored accordingly, as is shown in the following table:

Table VI

| | Treatment composition | Total number trees | Trees in category 0 | 1 | 2 | 3 | 4 | Rating sum of category number of trees |
|---|---|---|---|---|---|---|---|---|
| 1 | Lime | 27 | 4 | 9 | 8 | 6 | -- | 1.666 |
| 2 | Cube | 28 | 15 | 10 | 2 | 1 | -- | .628 |
| 3 | Tetra methyl thiuram disulfide (4 lbs.) | 28 | 23 | 5 | 0 | 0 | -- | .178 |
| 4 | Tetra methyl thiuram disulfide (2 lbs.) | 28 | 15 | 11 | 1 | 1 | -- | .571 |

These data show clearly that tetra methyl thiuram disulfide used at the rate of 4 pounds per 100 gallons of active constituent with 1 pound of rosin residue was the best treatment in that only 5 trees out of 28 were fed on at all and even on these 5 trees the feeding was very light. In the next best treatments, namely, cube 4 pounds rosin residue 4 pounds in 100 gallons and tetra methyl thiuram disulfide 2 pounds of active constituent and rosin residue 1 pound in 100 gallons, thirteen trees were fed upon, and in each treatment one tree was quite conspicuously injured. It is of further interest to note that these two treatments are of approximately the same efficiency in repelling the insects, i. e., preventing or discouraging them from feeding on the sprayed foliage.

The foregoing data shows that even at the rate of 2 pounds per 100 gallons, tetra methyl thiuram disulfide has an efficiency equal to that of the best reference with which it can be compared and is far superior to that of a recognized, recommended, and widely used standard treatment, namely, 20 pounds of lime, 3 pounds of aluminum sulfate in 100 gallons of water.

Anticipating the possibility that the foregoing test might not give as clear cut evidence on the persistence or lasting quality of the repellent effect of the thiuram sulfide and derris or cube, the following experiment was conducted near Newark. Each treatment was applied to about 150 linear feet of trellised grapes and 15 young plum trees. The application was made during heavy infestation of the plants. Direct comparison was made between the following two treatments:

(1) Derris (5 per cent rotenone, 18 per cent total extractives) _____ pounds__ 4
Rosin residue emulsion (mod. Goodhue-Fleming) _____ pounds__ 4
Water _____ gallons__ 100

(2) Tetra methyl thiuram disulfide (Composition A, 4 lbs. active) _____ pounds__ 5
Rosin residue emulsion (mod. Goodhue-Fleming) _____ pounds__ 1
Water _____ gallons__ 100

Observations were made at 2-day intervals. The initial efficiency of both treatments was alike and all beetles deserted the plants sprayed with either treatment within a short time after application. On the sixth day, invasion of derris-sprayed plants began and on the ninth day invasion of the thiuram sulfide-sprayed plants was first observed. At the time that the first invasion of this latter treatment was noted the infestation of the derris-treated plants was very heavy and conspicuous injury was being done to the plants.

This experiment shows that the period of maximum effectiveness of derris at a Japanese beetle repellent is not over six days, whereas that of the thiuram sulfide is nine days or one and one-half times as long as that of derris. These results are corroborated by investigators of the Department of Entomology of the University of Delaware using much smaller scale individual tests, namely, paired plants in yards, but repeated often. Their average figures were five days for derris and seven days for the thiuram sulfide.

From the foregoing it is apparent that the thiuram sulfides provide exceptionally effective repellents for controlling chewing insects, particularly Japanese beetles. Particularly effective control may be obtained by spraying the foliage at the imminence of infestation with an aqueous dispersion of the thiuram sulfides. When the spray is applied before the beetles appear in large numbers and maintained on the foliage during the ensuing period of infestation, heavy infestation is avoided, the beetles preferring untreated areas. Moreover, what infestation occurs results in little damage as feeding, even on more attractive foliage, is almost entirely prevented.

This application is a continuation-in-part of our copending application Serial No. 43,918, filed October 7, 1935.

We claim:

1. A repellent for chewing insects comprising a thiuram sulfide as an active ingredient, admixed with a finely divided inert material, and characterized by ready dispersibility in aqueous media for the formation of an aqueous suspension suitable for spraying.

2. A Japanese beetle repellent comprising tetra methyl thiuram disulfide as an active ingredient admixed with an inert material and characterized by ready dispersibility in aqueous media for the formation of an aqueous suspension suitable for spraying.

3. In a process for the protection of plants which are subject to attack by the Japanese beetle and which are located within an area of infestation the step of preventing the attack by applying to the plant at the imminence of infestation and maintaining on the plant during an ensuing actual infestation a material repulsive to the beetle, the active constituent of which is a thiuram sulfide, whereby the beetles are repelled, the actual attack prevented, and the plants protected from injury.

4. A method of protecting plant foliage from the attack of chewing insects which comprises spraying the foliage at the imminence of infestation with a spray composition containing a material repulsive to the insects an active constituent of which is a thiuram sulfide, said spraying being effected in a manner such and said spray composition being so compounded that a coating of spray residue is maintained on the foliage thruout the period of infestation.

WENDELL H. TISDALE.
IRA WILLIAMS.